No. 827,816. PATENTED AUG. 7, 1906.
G. A. OWEN.
ARBOR OR MANDREL FOR SLOTTING OR SPLINING MACHINES.
APPLICATION FILED SEPT. 23, 1905.
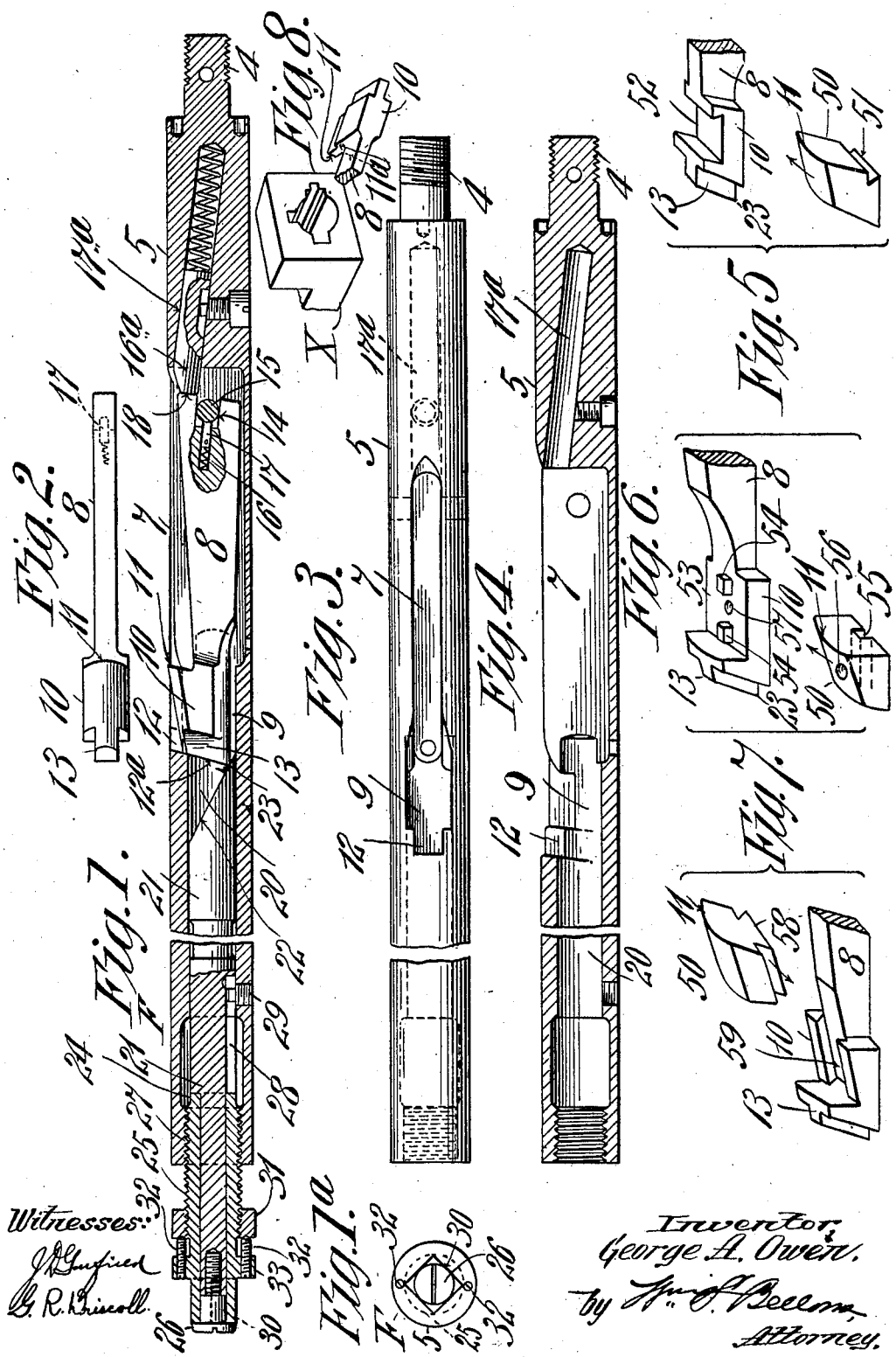
Witnesses:
Inventor:
George A. Owen,
by his Attorney.

UNITED STATES PATENT OFFICE.

GEORGE ALFRED OWEN, OF SPRINGFIELD, MASSACHUSETTS.

ARBOR OR MANDREL FOR SLOTTING OR SPLINING MACHINES.

No. 827,816.  Specification of Letters Patent.  Patented Aug. 7, 1906.

Application filed September 23, 1905. Serial No. 279,791.

*To all whom it may concern:*

Be it known that I, GEORGE ALFRED OWEN, a citizen of the United States of America, and a resident of Springfield, in the county of Hampden and State of Massachusetts, have invented certain new and useful Improvements in Arbors or Mandrels for Slotting or Splining Machines, of which the following is a full, clear, and exact description.

This invention relates to the tool or cutter carrying part or parts of slotting, splining, grooving, and analogous machines, commonly termed "arbors" or "mandrels," and the improvements particularly relate to the construction of the arbor for the reception and temporary retention therein of the bar which carries the tool or cutter and to the construction of the means comprised in the arbor for acquiring periodically and gradually more prominent successive positionings of the tool for its repeated cutting passes.

The invention also relates to means for maintaining the tool most firmly and rigidly in its position in the arbor and means pertaining to the tool-bar whereby heads or cutters thereof may be interchangeable or substituted.

Another object is to provide an adjustable stop for the cam-rod which controls the positioning of the cutter whereby such rod can have only a certain predetermined endwise motion in the arbor and whereby, consequently, the cutter will never be set out beyond the given predetermined extent, thus precluding any danger of the making of a too deep cut by inadvertence or oversight of the operation of the machine in which this arbor is included.

To these ends the invention consists in the parts having certain particular formations and the combinations of parts, all substantially as hereinafter fully described, and set forth in the claims.

The improved arbor is illustrated in the accompanying drawings, in which—

Figure 1 is a longitudinal section with certain parts shown in side view. Fig. 2 is a plan view of one of the tool or cutter bars. Fig. 1ª is a view of the left-hand end of the arbor. Fig. 3 is a plan view of the tool-receiver or body of the arbor. Fig. 4 is a longitudinal section of the receiver, the parts to be held therein having been removed. Figs. 5, 6, 7, and 8 are perspective views showing particular constructions of the tools.

The same or similar parts are denoted by corresponding reference characters in all of the views.

The cutting-arbor comprises a body or receiver portion 5, made, preferably, of round bar-steel, and the tool-carrying part is usually made in a section to be joined endwise to an elongated part at its right-hand end 4. The particular description of machine in which one or several of these improved arbors may be employed is found in an application for Letters Patent of the United States filed by me November 16, 1904, Serial No. 232,979, and wherein, moreover, explanation is to be found of the means for successively and intermittently rotationally moving the sleeve 25 for positioning the tool-bar for its new cuts on rapid passes. It is evident, however, that after the externally-threaded sleeve has been moved inwardly relatively to the body or receiver to such an extent as to bring the part 31 against the end of the receiver there may be no further outset of the tool for the making of a groove-like cut in the work deeper than prescribed.

The cutting-arbor F as a whole comprises a receiver portion 5, made, preferably, of round bar-steel. A mortise-like cut or trough-shaped recess 7 is provided about midway of receiver 5, into which snugly fits the shank of a cutting-tool 8, and at one end of this cut 7 is a slightly-widened continuation 9, in which the cutting-head 10 of said tool 8 closely fits, the cutting-point 11 projecting above the surface of receiver 5. In a further continuation of the cut is a narrow cut 12, the end of which is inclined or undercut, as shown in Figs. 2 and 4 at 12ª, and a narrow extension 13 of cutter-head 10, which fits into and is guided by this cut 12, has its end inclined or beveled to correspond with the inclined portion of the cut 12 described. The other end portion of the shank of the cutting-tool 8 has a deep notch 14, the sides of which are parallel and fit closely to a guide-pin 15. (Shown in section in Fig. 1.) Projecting into this notch 14 from a socket 16 in the tool 8 is a spring-plunger 17, which bears against the guide-pin 15, thus keeping the tool 8 pressed against the beveled end 12ª of cut 12, which pressure tends to keep the cutting-head 10 down to the bottom of its mortise 9, and to insure a more positive action a second and much stronger spring-plunger 16ª is provided in a hole 17ª in the solid end of receiver 5 and is adapted to press against the end 18 of the shank or tool 8.

Extending from one end of the receiver 5 into the cut 12 is a centrally-drilled hole 20, as clearly seen in Fig. 1, in which a round cam-rod 21 is adapted to slide. This cam-rod 21 has a cam-surface 22, here shown wedge-formed, adjacent the cut 12, which is adapted to engage the lower corner 23 of cutter-head 10. The opposite portion of cam-rod 21 for some distance from its extreme end is of reduced diameter and has a square shoulder 24. (Shown in section in Fig. 1.) An externally screw-threaded sleeve 25 is rotatably mounted on this portion of the cam-rod 21 and is held against displacement thereon by a retaining-screw 26. The screw-threaded portion of this sleeve 25 engages at 27 a tapped or screw-threaded section of the hole 20 in receiver 5. A longitudinal slot 28 is formed in the cam-rod 21, and the point of a screw 29 in receiver 5 engages therewith and prevents the cam-rod 21 from turning in the hole 20.

The extremity of the screw-threaded sleeve 25, that projects beyond the receiver 5, is formed square, as shown at 30, Figs. 1 and 1ª, and an adjustable stop-nut 31 is provided on sleeve 25 and is locked in any desired position on said sleeve by the set-screws 32, threading through the flange 33, which is formed on said sleeve 25, and setting against the stop-nut 31.

As frequent sharpening of the cutting-point 11 is found necessary and a consequent grinding away of the cutting-head 10 results, it has been found to be economical to provide separable cutting-blocks 50, which are adapted to be attached to the cutting-head 10 of the tool-bar 8, thus saving the cost of providing a complete cutting-tool, such as that illustrated in Fig. 2. There are various ways by which these separable cutting-blocks 50 may be attached to the cutter-heads 10 of the tool-bar, as illustrated in Figs. 5, 6, and 7 of the drawings. In Fig. 5 the separable cutter-head 50 is provided with a transversely-disposed dovetail slide 51, which slides with a driving fit in a corresponding dovetail slide-way 52 in cutter-head 10. Fig. 6 shows a cut-down flat surface 53 in the cutter-head 10, on which are the centering-blocks 54, with which a longitudinal groove 55 in cutter-head 50 engages. A screw may be passed down through a counterbored screw-hole 56 in block 50 into the screw-tapped hole 57 in cutter-head 10, serving to hold the parts securely together. Fig. 7 is a similar construction to that shown in Fig. 5; but in this case the cutting-block 50 is provided with a longitudinally-arranged depending dovetail slide-piece 58, which fits tightly in a corresponding dovetail slideway 59 in cutter-head 10.

Fig. 8 shows a specific form of tool and cutter wherein the angularly-extended cutter is narrower than the head.

Having thus described my invention, what I claim, and desire to secure by Letters Patent, is—

1. In an arbor, in combination, the arbor-body constructed with an opening, for a tool, therein, and a longitudinal bore beyond the tool-receiving opening, a cutting-tool in said opening, a rod or bar having at its end toward the tool-opening a cam inclined to cooperate with the tool, and provided with the longitudinal groove 28, the sleeve, externally threaded and screwing into a correspondingly-threaded end portion of the arbor, having an inner end-thrust bearing against the cam-bar, and said sleeve being provided with the flange 33, and having in screw engagement thereon the nut, adjacent the flange, and one or more set-screws threading through the flange and against the nut, and the stud penetrating the arbor-body and engaging in the cam-bar groove.

2. A tool-carrying arbor constructed with a mortise-like opening for a tool therein, having the recess for the head portion wider than that for the tool-bar or shank portion, and having, as a longitudinal continuation of the head-receiving recess, the narrower recess portion 12, combined with the tool comprising the shank-bar, the widened head 10 carrying the cutting-tool and the central longitudinally-extending narrowed extension 13.

3. A tool-carrying arbor constructed with a mortise-like opening for a tool therein, having the recess for the head portion wider than that for the tool-bar or shank portion, and having, as a longitudinal continuation of the head-receiving recess, the narrower recess portion 12 formed with the undercut and inclined end wall 12ª, combined with the tool comprising the shank-bar, the widened head 10 carrying the cutting-tool and the central longitudinally-extending narrowed extension 13, formed with the end thereof inclined, as shown.

4. A tool-arbor constructed with the opening for a tool therein, and a cutting-tool in said arbor comprising a shank-bar, a widened tool-carrying head, and a detachably-connected tool engaged with said head, and a cam-provided member adjustably movable within the arbor, and adapted to impinge against the head end portion of the tool-bar to outwardly set the cutter.

Signed by me at Springfield, Massachusetts, in presence of two subscribing witnesses.

GEORGE ALFRED OWEN.

Witnesses:
WM. S. BELLOWS,
J. D. GARFIELD.